United States Patent
Harada

(10) Patent No.: US 9,323,437 B2
(45) Date of Patent: Apr. 26, 2016

(54) METHOD FOR DISPLAYING SCALE FOR ENLARGEMENT AND REDUCTION OPERATION, AND DEVICE THEREFOR

(71) Applicant: Alpine Electronics, Inc., Tokyo (JP)

(72) Inventor: Keiichi Harada, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 56 days.

(21) Appl. No.: 13/741,001

(22) Filed: Jan. 14, 2013

(65) Prior Publication Data

US 2013/0229368 A1  Sep. 5, 2013

(30) Foreign Application Priority Data

Mar. 4, 2012 (JP) ................................ 2012-047464

(51) Int. Cl.
*G06F 3/0484* (2013.01)
*G06F 3/0488* (2013.01)

(52) U.S. Cl.
CPC ........ *G06F 3/04845* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 7,552,402 B2 * | 6/2009 | Bilow | 715/862 |
| 2004/0036714 A1 | 2/2004 | Blakely et al. | |
| 2009/0160792 A1 | 6/2009 | Morohoshi et al. | |
| 2010/0115407 A1 * | 5/2010 | Kim et al. | 715/708 |
| 2010/0289825 A1 * | 11/2010 | Shin et al. | 345/667 |
| 2011/0074710 A1 * | 3/2011 | Weeldreyer et al. | 345/173 |
| 2012/0030570 A1 | 2/2012 | Migos | |
| 2012/0223898 A1 * | 9/2012 | Watanabe et al. | 345/173 |
| 2013/0027404 A1 * | 1/2013 | Sarnoff | G06T 1/20 345/441 |
| 2013/0093792 A1 * | 4/2013 | Davidson | 345/650 |

FOREIGN PATENT DOCUMENTS

| | | |
|---|---|---|
| JP | 1992/054629 | 2/1992 |
| JP | 1997/054546 | 2/1997 |
| JP | 2004/086877 | 3/2004 |
| JP | 2009-163278 | 7/2009 |
| JP | 2011/018370 | 1/2011 |
| JP | 2012/038025 | 2/2012 |

* cited by examiner

*Primary Examiner* — Joseph Haley
*Assistant Examiner* — Emily Frank
(74) *Attorney, Agent, or Firm* — Brinks Gilson & Lione

(57) ABSTRACT

A method for displaying a scale for an enlargement and reduction operation on a touch screen includes detecting, using a multi-touch detection sensor, a plurality of touches by a user on the touch screen, and detecting an enlarging operation or a reducing operation caused by the user applying two operating fingers to the touch screen. An enlargement factor or a reduction factor is displayed on the touch screen at a position near the two operating fingers of the user.

16 Claims, 9 Drawing Sheets

(a)

(b)

20# METHOD FOR DISPLAYING SCALE FOR ENLARGEMENT AND REDUCTION OPERATION, AND DEVICE THEREFOR

PRIORITY CLAIM

This application claims the benefit of Japanese Patent Application No. 2012-047464, filed on Mar. 4, 2012, and which is incorporated by reference herein in its entirety.

BACKGROUND

1. Field of the Invention

The present invention relates to a method for displaying a scale display for an enlargement and reduction operation and a device that are capable of displaying a scale of a map in an easily understandable manner when an operation of enlarging or reducing the map is performed with a thumb and an index finger.

2. Description of Related Art

Recently, touch panels are laid on liquid crystal displays of various appliances, and various operations are performed by touch operations. For example, as shown in FIG. 8A, a map can be enlarged or reduced in a navigation device by moving the display of a scale marker displayed on the map. A display as shown in FIG. 8B is thereby obtained.

Moreover, although there are many types of touch panels, a touch panel that uses multi-touch detection to detect operating objects at multiple points is widely used in recent years as a touch panel with extremely high operability. With the touch panel that uses multi-touch detection, an operation of enlarging or reducing a part of a screen with a thumb and an index finger, for example, is performed, and the displayed screen is thereby enlarged or reduced.

A typical example is a map screen. When the map is displayed as shown in FIG. 8B, an operation of enlarging the map by performing an operation of pinching out a part of the map with a thumb and an index finger, and an operation of reducing the map by performing an operation of closing the thumb and the index finger together are performed. These states are shown in FIGS. 9A and 9B.

Additionally, a technology is disclosed in Japanese Patent Application Laid-Open No. 2009-163278 according to which a portable device includes a casing, a display that is provided to the casing and that includes a first side in proximity to a portion which is held by a user, a plurality of icons that are displayed on the display, a touch panel that is provided accordingly on the surface of the display and that allows the icons to be operated, and a sensor that is provided to the casing and that senses the portion held by the user, where the plurality of icons are positioned in a first area defined by an arc having a first corner located at a lower end of the first side as the center and chords extending between the arc and the first corner and where the operability of a GUI can be improved according to the using circumstances of the user.

SUMMARY

When performing an operation of pinching out with a thumb and an index finger on a map screen to enlarge a map or an operation of sandwiching with the thumb and the index finger to reduce the map, the map is accordingly enlarged or reduced. During this time, the scale of the map is displayed in the same manner as the conventional manner shown in FIG. 8A.

The scale is thus at the conventional scale position as shown in FIGS. 9A and 9B, and one has to move his/her gaze to actually see the actual scale. Therefore, it is difficult and burdensome for a user to check the current scale.

Accordingly, embodiments of the present invention provide a method for displaying a scale for an enlargement and reduction operation and a device therefor enabling a user to instantly recognize an enlargement factor or a reduction factor at the time of performing an operation of enlargement or reduction with two operating fingers.

To solve the above-mentioned problem, according to an aspect of the present invention, a method for displaying a scale for an enlargement and reduction operation includes: using a multi-touch detection sensor that detects a plurality of touches; and displaying a magnification factor near two operating fingers in a magnification factor display processing method for detecting an operation of enlarging or reducing a screen by touches using the two operating fingers and displaying an enlargement factor or a reduction factor.

In the method for displaying a scale for an enlargement and reduction operation according to the aspect of the present invention, the enlargement factor or the reduction factor is arranged at a position not in shadow of the two operating fingers.

The method for displaying a scale for an enlargement and reduction operation according to the aspect of the present invention further includes: providing a camera for capturing touches using the two operating fingers; recognizing a right-hand operation or a left-hand operation by the camera; and arranging the enlargement factor or the reduction factor at a position not in the shadow of the two operating fingers according to the right-hand operation or the left-hand operation.

To solve the above-mentioned problem, according to an another aspect of the present invention, a device for displaying a scale for an enlargement and reduction operation includes a multi-touch detection sensor that detects a plurality of touches, in which, in a magnification factor display processing method for detecting an operation of enlarging or reducing a screen by touches using two operating fingers and displaying an enlargement factor or a reduction factor, a magnification factor is displayed near the two operating fingers.

In the device for displaying a scale for an enlargement and reduction operation according to the other aspect of the present invention, the enlargement factor or the reduction factor is arranged at a position not in shadow of the two operating fingers.

The device for displaying a scale for an enlargement and reduction operation according the other aspect of the present invention further includes a camera for capturing touches using the two operating fingers, in which a right-hand operation or a left-hand operation is recognized by the camera and the enlargement factor or the reduction factor is arranged at a position not in the shadow of the two operating fingers according to the right-hand operation or the left-hand operation.

In the device for displaying a scale for an enlargement and reduction operation according to the other aspect of the present invention, the screen shows a map and the magnification factor is a distance of one division.

In the device for displaying a scale for an enlargement and reduction operation according to the other aspect of the present invention, the screen shows a map and the magnification factor is a scale of the map.

In the device for displaying a scale for an enlargement and reduction operation according to the other aspect of the present invention, the screen shows a map and the magnification factor indicates how many times larger or smaller the map is than a previous map.

In the device for displaying a scale for an enlargement and reduction operation according to the other aspect of the present invention, the screen shows an image and the magnification factor is in pixels.

In the device for displaying a scale for an enlargement and reduction operation according to the other aspect of the present invention, the screen shows an image and the magnification factor indicates how many times larger or smaller the image is than a previous image.

In the device for displaying a scale for an enlargement and reduction operation according to the other aspect of the present invention, the screen shows a text display and the magnification factor is in points.

In the device for displaying a scale for an enlargement and reduction operation according to the other aspect of the present invention, display of the magnification factor is erased after a predetermined period of time.

Since the present invention is configured as above, the present invention can enable a user to instantly recognize the enlargement factor or the reduction factor at the time of performing the operation of enlarging or reducing the screen with two operating fingers.

DETAILED DESCRIPTION

Figure 1:
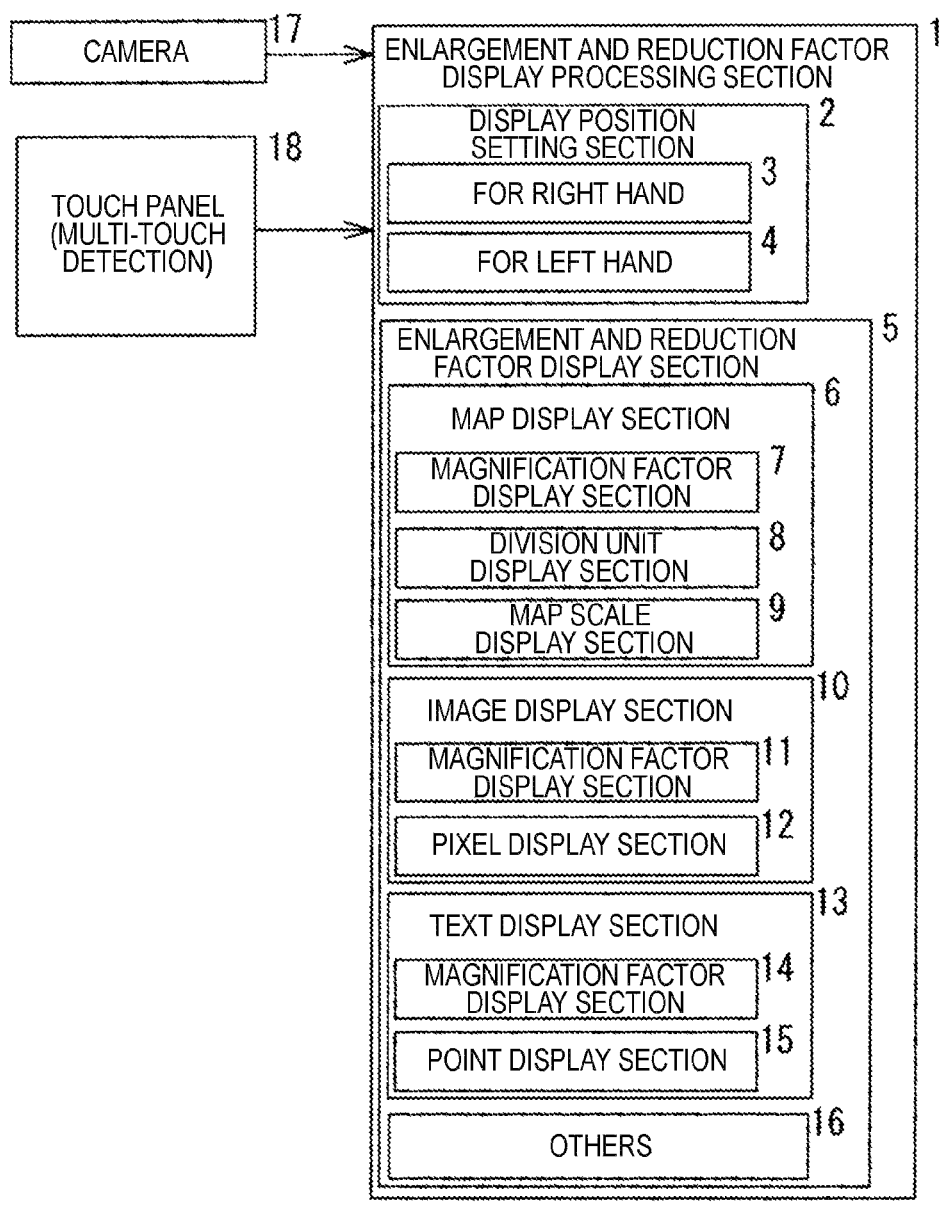
FIG. 1 is a functional block diagram of an embodiment of the present invention.

An embodiment of the present invention will be described with reference to the drawings. FIG. 1 is a functional block diagram according to an embodiment of a method for displaying a scale for an enlargement and reduction operation and a device therefor, and is a functional block diagram according to which the present invention can be carried out in various modes. Additionally, in this drawing, a function section for performing each function can be said to be means for performing each function.

Figure 3A:
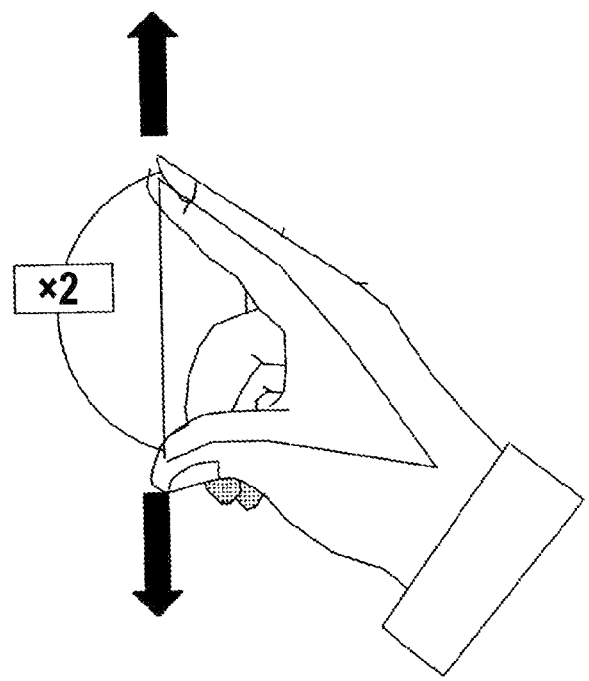
FIGS. 3A and 3B are views showing operation modes of the embodiment.

In FIG. 1, an enlargement and reduction factor display processing section 1 includes an enlargement and reduction factor display position setting section 2 allowing setting of a position of an enlargement or reduction factor. The enlargement and reduction factor display processing section 1 may correspond to a separate and distinct processing component or central processing unit, such as a microprocessor, program logic array, or other hardware component. This enlargement and reduction factor display position setting section 2 is for setting the position of the enlargement or reduction factor, and detects whether the current operating fingers, captured by a camera 17 that is externally provided, are fingers of the right hand or the left hand. If the fingers are those of the right hand, the enlargement and reduction factor display position setting section 2 performs display as "for right hand" 3 on an open side of the right-hand operating fingers as shown in FIG. 3A.

Figure 3B:
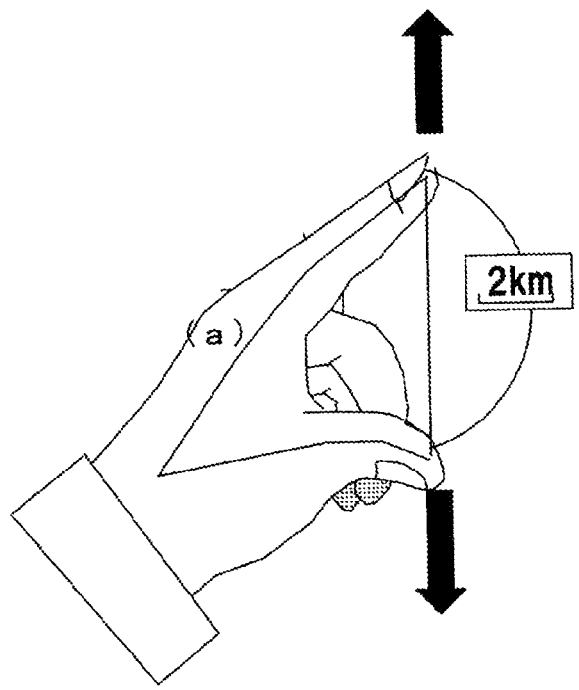

That is, when performing the operation with a thumb and an index finger, the display is performed at a position slightly outside a line connecting the tips of the thumb and the index finger and at a position where the operating fingers do not get in the way and where the scale factor is easily visible. In contrast, in the case of "for left hand" 4, the display is performed on an open side of the left-hand operating fingers as shown in FIG. 3B at a position where the display is easily visible. The enlargement factor and the reduction factor can be set to be erased after a while.

An enlargement and reduction factor display section 5 is for displaying the enlargement factor or the reduction factor. When a map is to be displayed, the enlargement and reduction factor display section 5 displays, at a map display section 6, the enlargement factor or the reduction factor of the map at a position set by the display position setting section 2. Regarding the enlargement or reduction factor of a map, the display of a magnification factor "a times" meaning the enlargement of the current map by two or three times, for example, is performed by a magnification factor display section 7 as shown in FIG. 3A. FIG. 3A shows a state where the thumb and the index finger are moved in the direction of separating from each other to enlarge the screen display, and this operation is an operation that is generally used for enlarging a screen. FIG. 3A shows a state where the operation is performed with the right hand, and is an example where the magnification factor is displayed on the open side of the two operating fingers.

Furthermore, it is also possible to perform, by a division unit display section 8, the display of the enlargement or reduction factor indicating that one division is b km, as shown in FIG. 3B. FIG. 3B shows a state where the left hand is used and the thumb and the index finger are moved in the direction of separating from each other as in FIG. 3A, and is an example where the magnification factor is displayed on an open side of one operating finger.

Figure 4A:
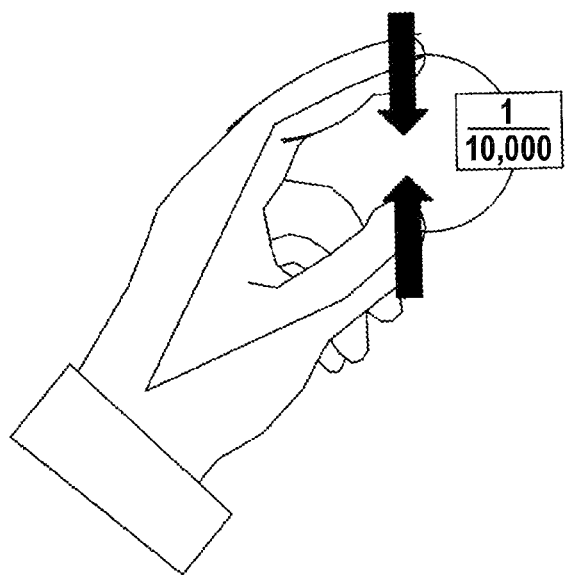
FIGS. 4A and 4B are views showing other operation modes of the embodiment.
Figure 4B:
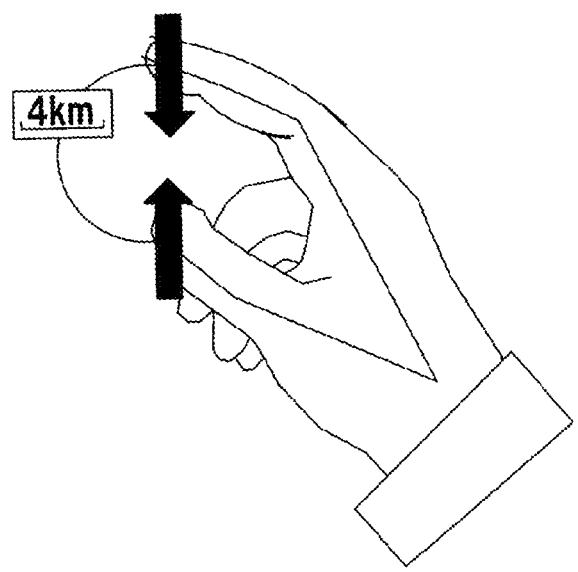

Also, a map scale display section 9 displays the enlargement factor and the reduction factor by a scale of a map such as "1/30,000". Here, a display as shown in FIG. 4A is performed. FIG. 4A shows a state where the operation is performed of moving the thumb and the index finger in the direction of approaching each other by performing the operation in such a manner as to pinch an object with the thumb and the index finger, and is an example where the operation of reducing the screen is performed. FIG. 4A shows an example where the operation is performed with the right hand, and FIG. 4B shows an example where the operation is performed with the left hand. In FIG. 4B, it is indicated that the map is reduced to a map where one division is 4 km.

Figure 5A:
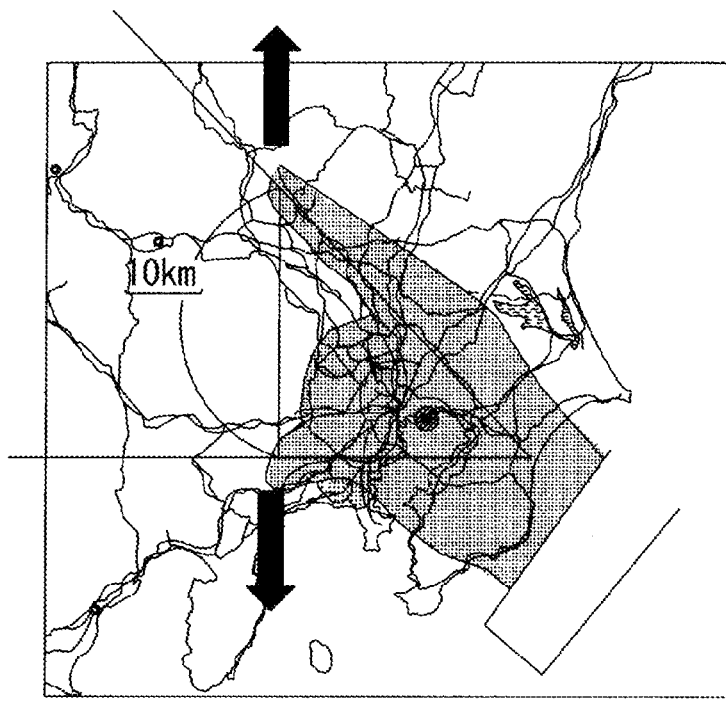
FIGS. 5A and 5B are views showing other operation modes of the embodiment.

FIG. 5A shows an example where the display is being enlarged on a map screen. When the display is enlarged with the right hand, it is indicated, on the open side of the operating fingers, that a map whose scale is at 10 km per division is displayed. The scale can be therefore displayed at a position that is not in the shadow of the right hand.

Figure 5B:
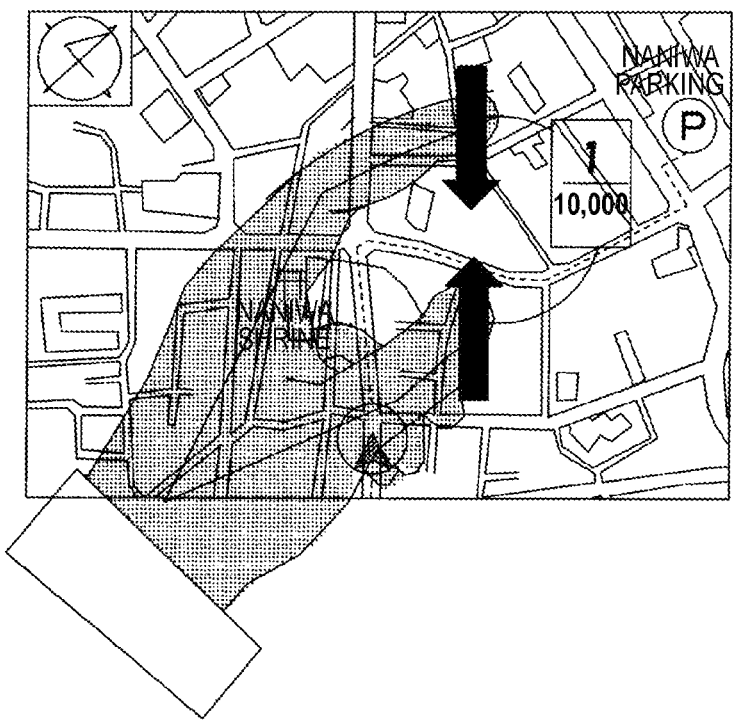

Furthermore, FIG. 5B shows an example where an operation of reducing a map is performed by actually performing an operation of pinching the map with the left-hand operating fingers on the map screen. It is indicated, on the open side of the fingers, that a map whose size is 1/10,000 is displayed.

The enlargement and reduction factor display section 5 of FIG. 1 includes a screen display section 10, and the display of a magnification factor is also allowed with respect to a screen, regarding an operation on the enlargement or reduction factor. Regarding the magnification factor, the display of the magnification factor "a times" is performed by a magnification factor display section 11. The display indicating the enlargement or reduction of the current image by "a times" is performed by the magnification factor display section 11 with respect to the magnification factor.

Figure 6A:
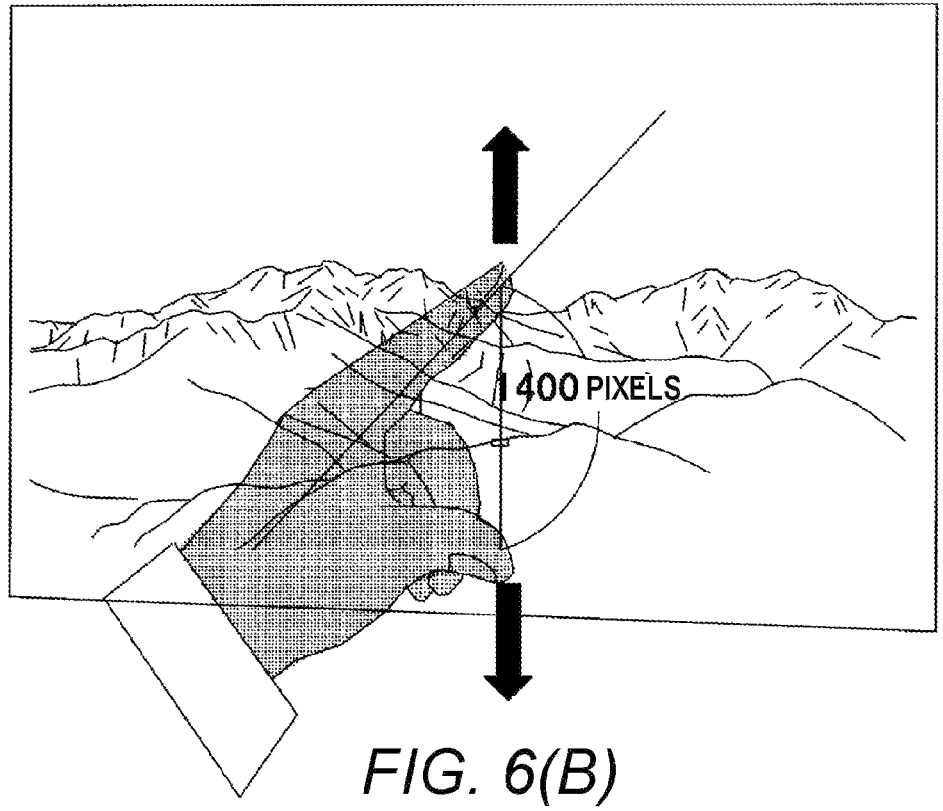
FIGS. 6A and 6B are views showing other operation modes of the embodiment.

Furthermore, FIG. 6A shows a state where the size of a screen is displayed in pixels. In this drawing, an example is shown where that a part of a landscape photo is being enlarged with two left-hand operating fingers to obtain a 1400-pixel screen on the open side of the operating fingers. Such display of a scale based on pixels is performed by a pixel display section 12.

Figure 7A:
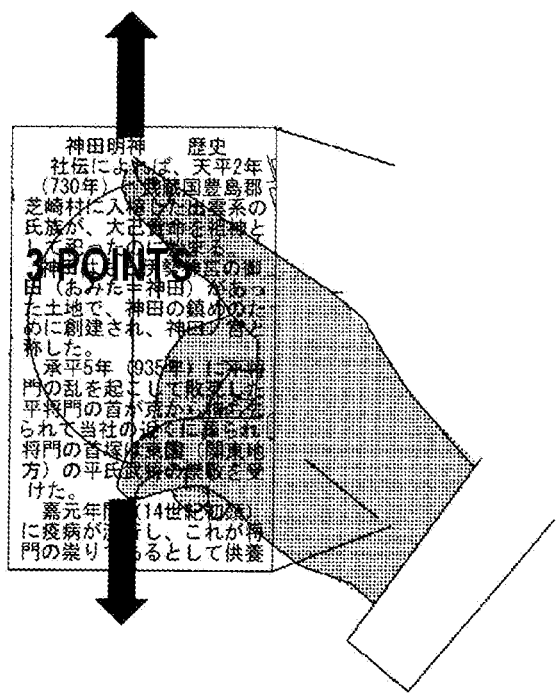
FIGS. 7A and 7B are views showing other operation modes of the embodiment.

The enlargement and reduction factor display section 5 of FIG. 1 includes a text display section 13, and displays the enlargement factor of a text. An example is shown in FIG. 7A. FIG. 7A shows the example where, when one tries to enlarge a text with the right hand while viewing the text on a smartphone, the size of the text to be enlarged is displayed on the open side of the right hand, assuming that the size is "3 Pt".

Figure 7B:
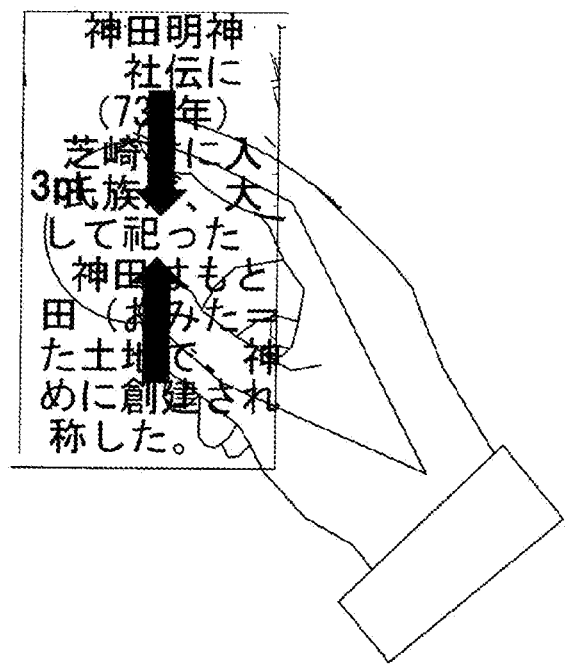
Figure 8A:
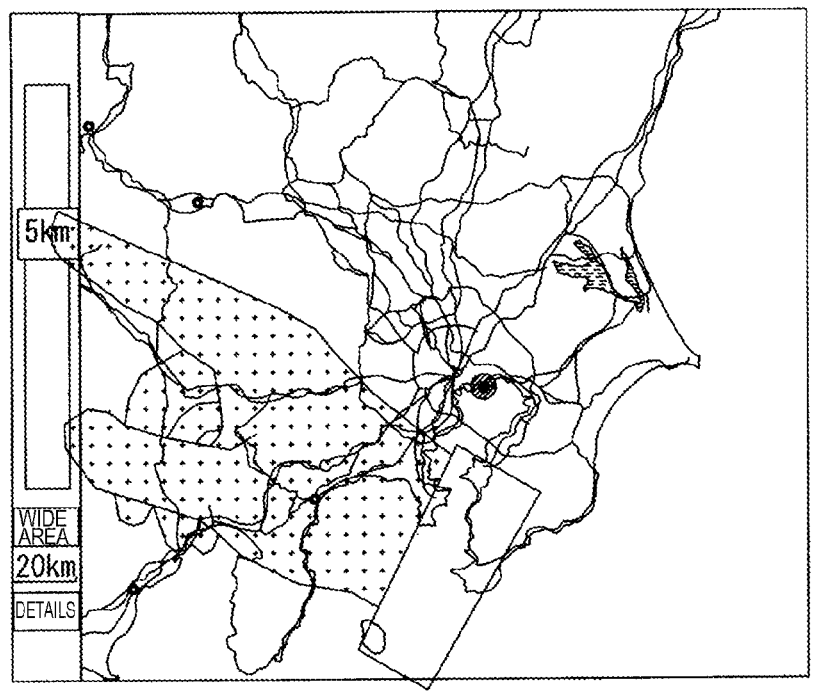
FIGS. 8A and 8B are views showing modes of a conventional example.
Figure 8B:
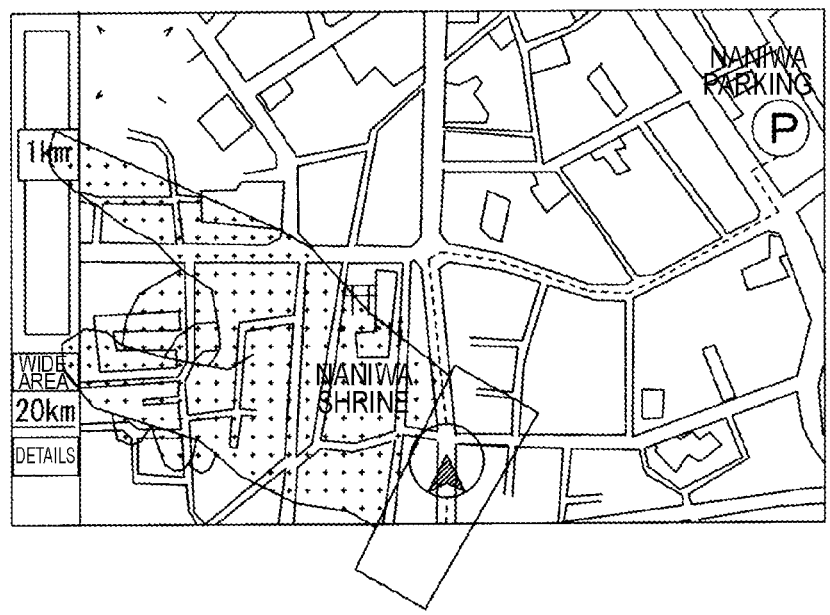
Figure 9A:
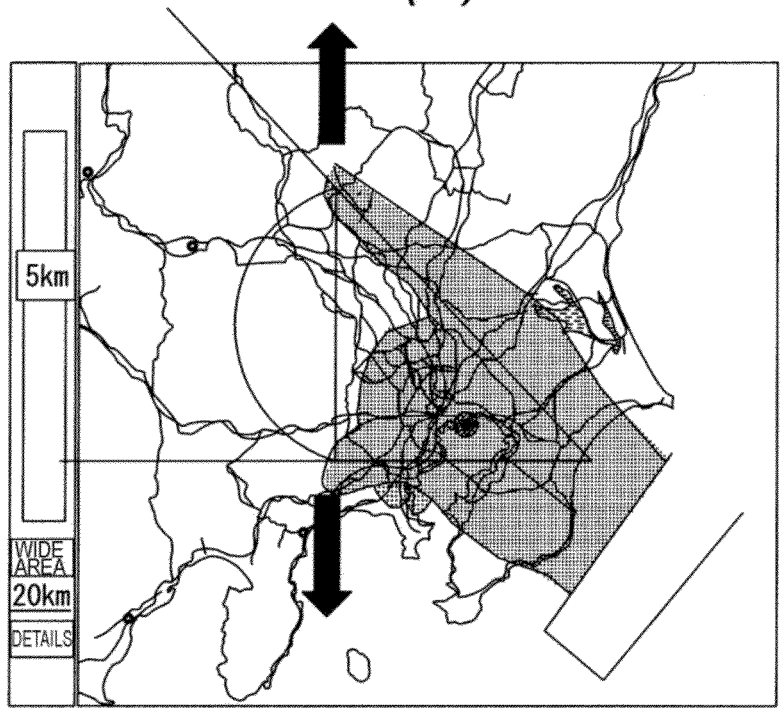
FIGS. 9A and 9B are views showing other modes of the conventional example.
Figure 9B:
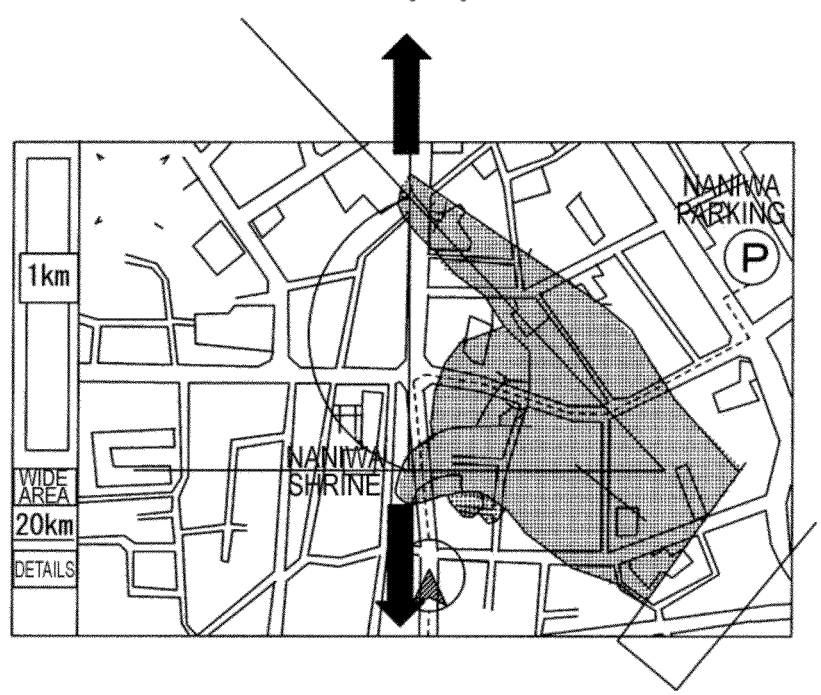

The letters of this magnification factor are also displayed at a position where the right-hand operating fingers do not get in the way, and are erased after a while. FIG. 7B shows a state where the text is displayed in a reduced manner using the right hand. Here, an example of performing the reduced display so that the size is "3 Pt (points)" is illustrated. Also, in this drawing, the letters can be set to be erased after a predetermined period of time has elapsed.

Figure 2:
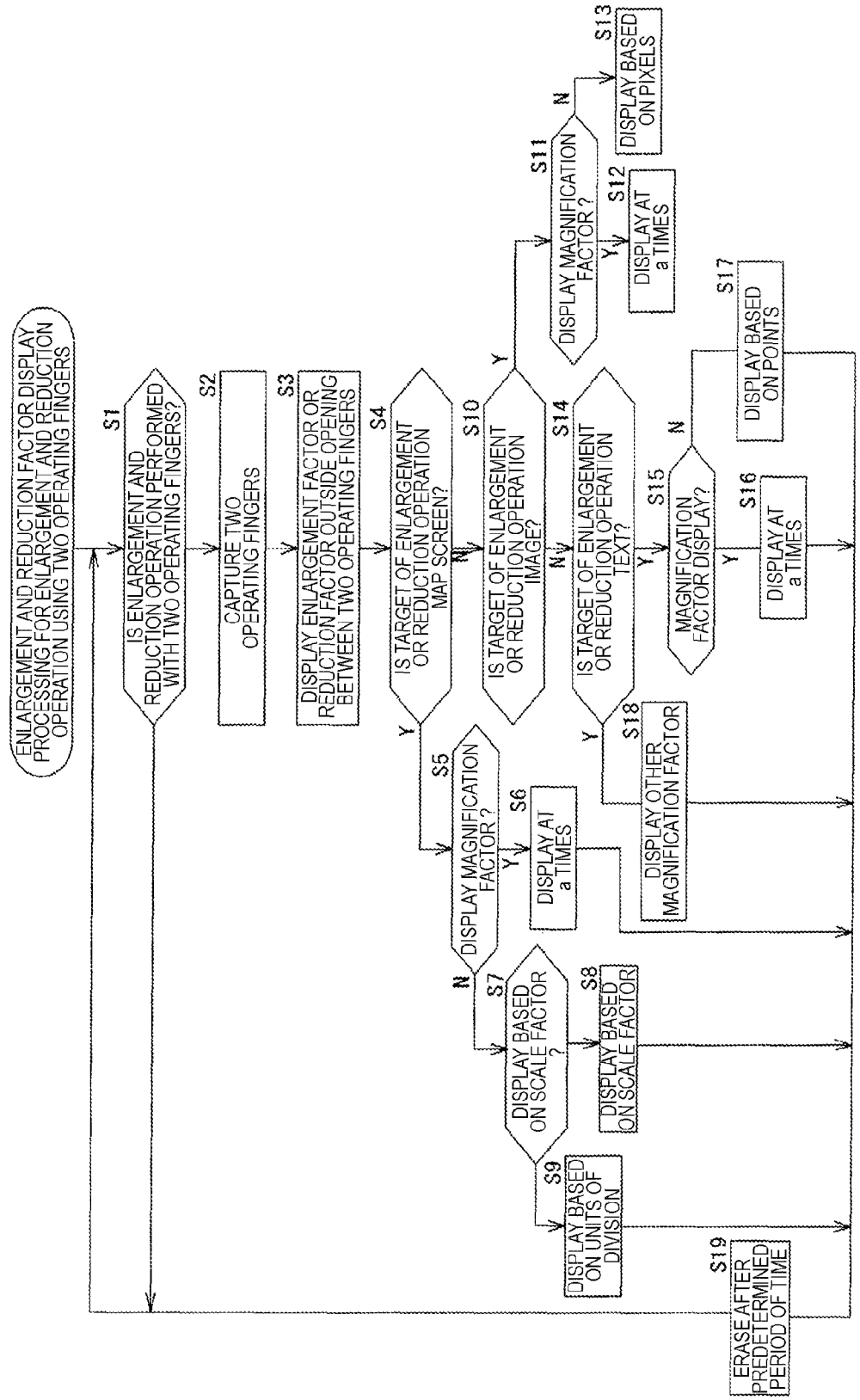
FIG. 2 is an operation flow diagram of the embodiment.

FIG. 2 shows an operation flow diagram of the embodiment of the present invention. The present invention can be carried out by sequentially performing the steps in accordance with the operation flow. In the enlargement and reduction factor display process shown in FIG. 2 for an enlargement and reduction operation using two operating fingers, it is firstly determined whether or not an enlargement and reduction operation is performed using two operating fingers (step S1). If it is determined that the enlargement and reduction operation by two operating fingers is not yet performed, a standby state is continued while performing this step until the operation is performed.

When it is determined in step S1 that the enlargement and reduction operation by two operating fingers is performed, the two operating fingers are captured by a camera (step S2). Then, an enlargement factor or a reduction factor is displayed outside the opening between the two operating fingers (step S3). At this time, the camera is capable of identifying whether the operating hand is the right hand or the left hand based on the positions of the two operating fingers. Thus, when the two operating fingers are the thumb and the index finger, the enlargement factor or the reduction factor is displayed outside a line connecting the tips of the fingers, that is, at a position outside the space between the thumb and the index finger. This display can be erased after a predetermined period of time has elapsed.

Then, in the embodiment shown in FIG. 2, it is determined whether or not the target of the enlargement or reduction operation is a map screen (step S4). When it is determined that the target is the map screen, it is determined whether or not to perform magnification factor display (step S5) according to the example shown in FIG. 2. When the display of the magnification factor here is the display of "a times", a magnification factor such as "×2" is displayed as shown in FIG. 3B (step S6).

Also, when it is determined that the display of the magnification factor such as "a times" is not performed, it is determined whether or not to perform display of a scale factor (step S7). When it is determined that the display is performed based on the scale factor, the scale factor such as "1/10,000" is displayed as shown in FIG. 4A (step S8). Moreover, when it is determined in step S8 that the display using the scale factor is not to be performed, the display based on units of division such as "2 km" and "4 km" is performed as shown in FIGS. 3A and 4B (step S9).

On the other hand, when it is determined in step S4 that the target of the enlargement and reduction is not a map screen, it is determined whether or not the target of the enlargement and reduction is an image (step S10). When it is determined that the target that is currently to be enlarged or reduced is an image, it is then determined whether or not display of a magnification factor is performed (step S11) according to an example of the drawing.

Figure 6B:
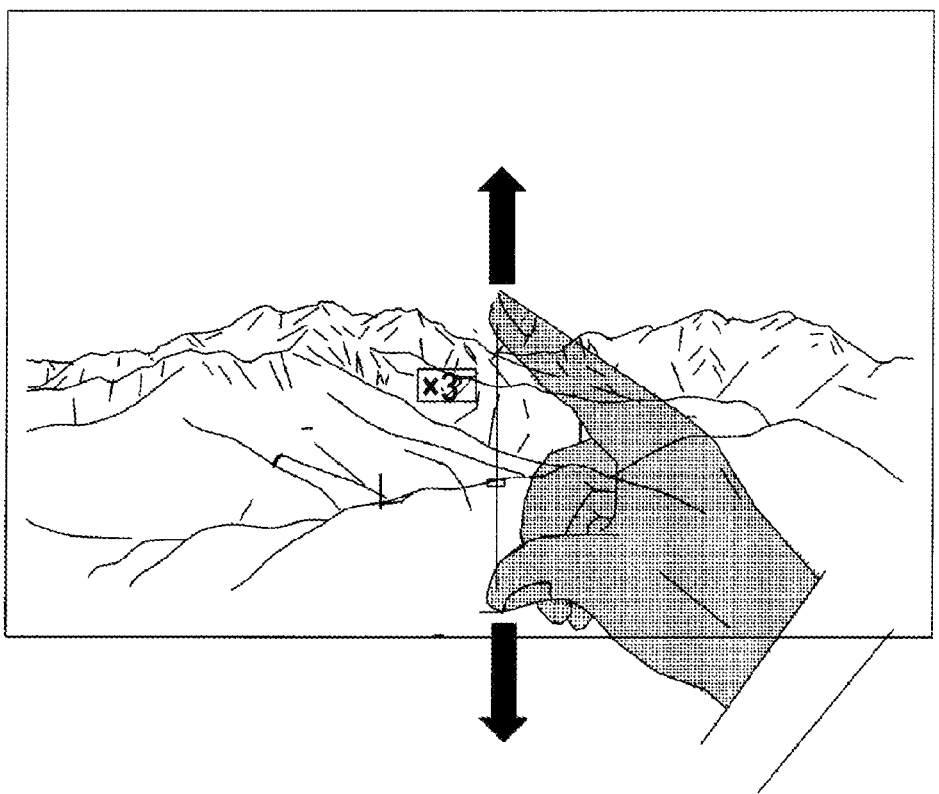

When it is determined that the display of a magnification factor is to be performed, the display of a magnification factor such as "×3" is performed as shown in FIG. 6B, for example (step S12). On the other hand, when it is determined in step S11 that the display of the magnification factor is not to be performed, the process proceeds to step S13, and the display based on pixels such as 1400 pixels is performed as shown in FIG. 6A (step S13).

On the other hand, when it is determined in step S10 in FIG. 2 that the target of enlargement or reduction is not an image, it is determined whether or not the target of the enlargement and reduction operation is a text (step S14). When it is determined that the enlargement and reduction operation is to be performed on a text, it is determined whether or not to perform display using a magnification factor (step S15). If the display is to be performed based on a magnification factor, the display of an enlargement factor or a reduction factor indicating that the text is to be enlarged or reduced by "a times" is performed. When it is determined in step S15 that display of a magnification factor is not to be performed, display is performed based on points as shown in FIG. 7A. At this time, an abbreviation "Pt" can be used as shown in FIG. 7B.

When it is determined in step S14 that an enlargement and reduction operation is not to be performed on a text, it is assumed in FIG. 2 that another operation is performed (step S18), and the enlargement and reduction operation is performed for other than maps, images and texts. Then, after all the enlargement and reduction factor display processes are finished, the display of the enlargement or reduction factor is erased in step S19 after a predetermined period of time, and the process returns to step S1 again.

The below reference signs list corresponds to the reference numerals shown in the figures, and in particular, FIG. 1, as follows:

1 Enlargement and reduction factor display processing section
2 Display position setting section
3 For right hand
4 For left hand
5 Enlargement and reduction factor display section
6 Map display section
7 Magnification factor display section
8 Division unit display section
9 Map scale display section
10 Image display section
11 Magnification factor display section
12 Pixel display section
13 Text display section
14 Magnification factor display section
15 Point display section
16 Others Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. A method for displaying a scale for an enlargement and reduction operation on a touch screen, the method comprising:
   detecting, using a multi-touch detection sensor, a plurality of touches by a user on the touch screen;
   detecting an enlarging operation or a reducing operation caused by the user applying two operating fingers to the touch screen;
   capturing, using a camera, the touches of the two operating fingers of the user, and determining whether the touch is a right-hand operation of the user or a left-hand operation of the user; and
   displaying an enlargement factor or a reduction factor on the touch screen at a position adjacent the two operating fingers of the user based on the determination of the right-hand operation or left-hand operation, such that the enlargement factor or reduction factor is displayed at a position outside a line connecting tips of the two fingers of the user;
   wherein the touch screen displays text, and the enlargement factor or the reduction factor indicates a point value corresponding to the displayed text.

2. The method according to claim 1, wherein the enlargement factor or the reduction factor is arranged at a position not in a shadow of the two operating fingers.

3. The method according to claim 1, wherein the touch screen displays a map, and the enlargement factor corresponds to a distance of one division.

4. The method according to claim 1, wherein the touch screen displays a map, and the enlargement factor corresponds to a scale of the map.

5. The method according to claim 1, wherein the touch screen displays a map, and the enlargement factor or the reduction factor indicates how many times larger or smaller, respectively, the map is relative to a previous map.

6. The method according to claim 1, wherein the touch screen displays an image, and the enlargement factor corresponds to a number of pixels.

7. The method according to claim 1, wherein the touch screen displays an image, and the enlargement factor or the reduction factor indicates how many times larger or smaller, respectively, the image is relative to a previous image.

8. The method according to claim 1, wherein display of the enlargement factor or the reduction factor is erased after a predetermined period of time.

9. A device for displaying on a touch screen, a scale for an enlargement operation or a reduction operation, the device comprising:
   a multi-touch detection sensor configured to detect a plurality of touches on the touch screen by a user;
   a camera configured to detect the touches of two operating fingers of the user;
   a magnification factor processor configured to detect an operation of enlarging or reducing a screen image by the user that touches the touch screen using the two operating fingers and configured to determine whether the touch is a right-hand operation of the user or a left-hand operation of the user based on the detection by the camera; and;
   wherein the magnification factor processor displays on the touch screen, a graphic adjacent a position of the two operating fingers of the user, representing an enlargement factor or a reduction factor corresponding to the touch of the user, such that the enlargement factor or reduction factor is displayed at a position outside a line connecting tips of the two fingers of the user based on the determination of the right-hand operation or the left-hand operation;
   wherein the touch screen displays text, and the enlargement factor or the reduction factor indicates a point value corresponding to the displayed text.

10. The device according to claim 9, wherein the enlargement factor or the reduction factor is arranged at a position not in shadow of the two operating fingers of the user.

11. The device according to claim 9, wherein the touch screen displays a map, and the enlargement factor corresponds to a distance of one division.

12. The device according to claim 9, wherein the touch screen displays a map, and the enlargement factor corresponds to a scale of the map.

13. The device according to claim 9, wherein the touch screen displays a map, and the enlargement factor or the reduction factor indicates how many times larger or smaller, respectively, the map is relative to a previous map.

14. The device according to claim 9, wherein the touch screen displays an image, and the enlargement factor corresponds to a number of pixels.

15. The device according to claim 9, wherein the touch screen displays an image, and the enlargement factor or the reduction factor indicates how many times larger or smaller, respectively, the image is relative to a previous image.

16. The device according to claim 9, wherein display of the enlargement factor or the reduction factor is erased after a predetermined period of time.

* * * * *